No. 707,309. Patented Aug. 19, 1902.
H. ELLIS & N. W. PERKINS, Jr.
ADDING MACHINE.
(Application filed Nov. 9, 1901.)
(No Model.) 9 Sheets—Sheet 4.

Attest:
J. B. Padfield
Geo. P. Neubrunner

Inventors:
Halcolm Ellis
Nathan W. Perkins Jr.

No. 707,309. Patented Aug. 19, 1902.
H. ELLIS & N. W. PERKINS, Jr.
ADDING MACHINE.
(Application filed Nov. 9, 1901.)

(No Model.) 9 Sheets—Sheet 5.

Attest:
J. B. Padfield
Geo. P. Weinbrenner

Inventors.
Halcolm Ellis
Nathan W. Perkins Jr

No. 707,309. Patented Aug. 19, 1902.
H. ELLIS & N. W. PERKINS, Jr.
ADDING MACHINE.
(Application filed Nov. 9, 1901.)

(No Model.) 9 Sheets—Sheet 8.

Attest:
J. B. Gadfield
Geo. P. Neubrenner

Inventors.
Halcolm Ellis.
Nathan W. Perkins Jr.

UNITED STATES PATENT OFFICE.

HALCOLM ELLIS AND NATHAN W. PERKINS, JR., OF ST. LOUIS, MISSOURI, ASSIGNORS TO CHARLES H. FILLEY, OF ST. LOUIS, MISSOURI.

ADDING-MACHINE.

SPECIFICATION forming part of Letters Patent No. 707,309, dated August 19, 1902.

Application filed November 9, 1901. Serial No. 81,735. (No model.)

*To all whom it may concern:*

Be it known that we, HALCOLM ELLIS and NATHAN W. PERKINS, Jr., of the city of St. Louis and State of Missouri, have invented certain new and useful Improvements in Adding and Recording Machines, of which the following is a full, clear, and exact description, reference being had to the accompanying drawings, which are made part of this specification.

This invention relates to that class of adding-machines in which the amount is first set up on the keyboard by depressing the keys, after which a handle is operated which causes the machine to add and at the same time print on a paper the amount so set up on the keys; and it consists in features of novelty which will be more particularly set forth in the description of the mechanism and operations as illustrated in the drawings.

The principal features of this machine in which it differs from other machines of its class consist in its simplicity, small number of parts employed, the directness of its action, silent operation, direct printing from the type, a complete system of locks whereby every function of the machine must complete its movement before any other interfering movement can commence, visible printing, and a paper-carriage that can be adjusted to any desired position laterally.

Referring to the drawings, it will be seen that the machine is mounted on a base 1 and that the mechanism is mostly inclosed in a case 2.

The machine consists of several distinct features or groups of mechanisms, which by their coöperation go to produce the results desired. These groups will be described separately, with their operations.

Figure 11:
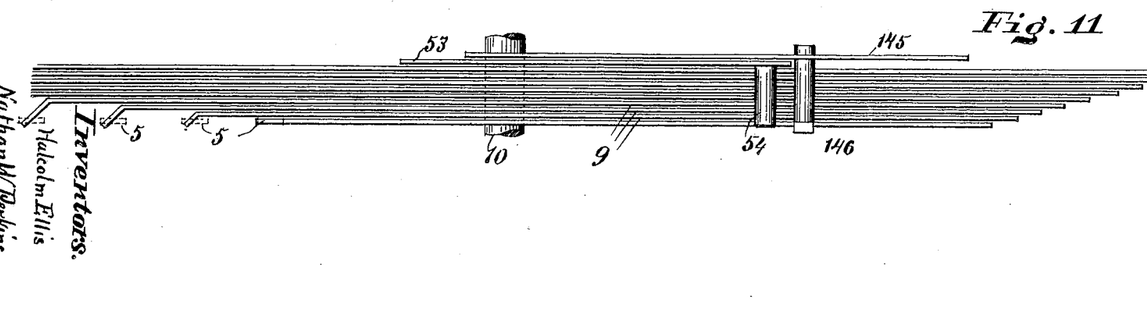
Fig. 11 is a top view or plan of a nest of stop-bars, showing automatic "0" stop-bars and rack-engaging bar.

*The keyboard.*—The keyboard consists of a lower and upper plate 3 and 4, through which the key-stems 5 extend. These key-stems 5 have notches 6 alternately cut from their front and back edges, and strips 7, secured to the plate 3, prevent the key-stems 5 from being withdrawn. The upper end of the key-stems 5 are capped by the usual button 8, numbered on its upper face from "1" to "9." The lower ends of the key-stems 5 rest on the upper edge of the stop-bars 9, the ends of which are bent to the right, where necessary, to bring them under the key-stems 5, as clearly shown in Fig. 11, where the position of the key-stems 5 is indicated in dotted lines. The stop-bars 9 are pivoted on a rod 10, suitably supported from the base 1, and are held in their normal position by the action of springs 11, which tend to elevate their forward ends. On the upper side of the stop-bars 9 is a curved projection taken with a radius from the center of the pivot-rod 10, which bears the catch-lug 12. A trigger 13 of a width of nine stop-bars 9 is pivoted from a rod 14 and held in contact by a spring 15. From the front side of the trigger 13 a wire 16 extends forward and is bent across the front edge of the first key-stem 5, which is the error-key E. The wire 16 engages a notch with an inclined edge in the stem 5 of the error-key E, so that when the error-key E is depressed the trigger 13 is drawn forward and releases the lugs 12 on the stop-bars 9.

Figures 9, 10:
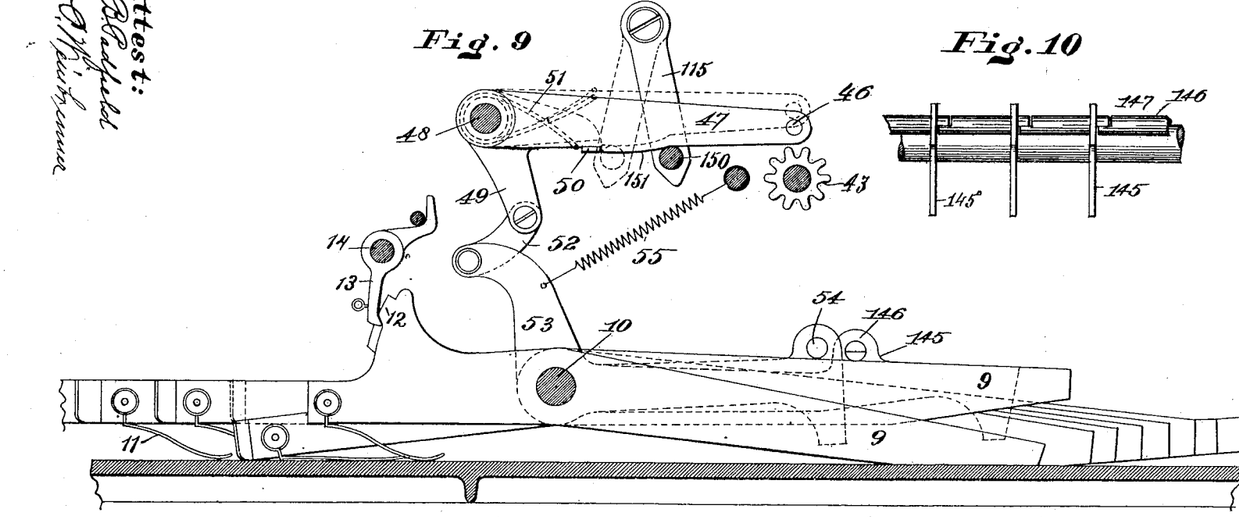
Fig. 9 is an enlarged detail showing the rack-engaging mechanism in operation.
Fig. 10 is a front view of the automatic "0" stop-bars.

The operation of the keyboard and connections is as follows: A key is depressed. It in turn depresses the forward end of the corresponding stop-bar 9 until the lug 12 has passed the point of the trigger 13, which at once springs in above it and holds the stop-bar 9 in its new position, as clearly shown in Fig. 9, where the stop-bar 9, operated by the key numbered "8," is shown depressed. The rear ends of the stop-bars 9 are graduated in length, the stop-bar 9 for the key numbered "1" being longest and the stop-bar 9 for the key numbered "9" the shortest. If an error be made in depressing the keys, the error-key E is depressed and the stop-bars 9 resume their normal position, as above described. In the machine shown in the drawings there are nine sets of stop-bars 9, one for each column of keys, all alike in form and operation.

Figure 1:
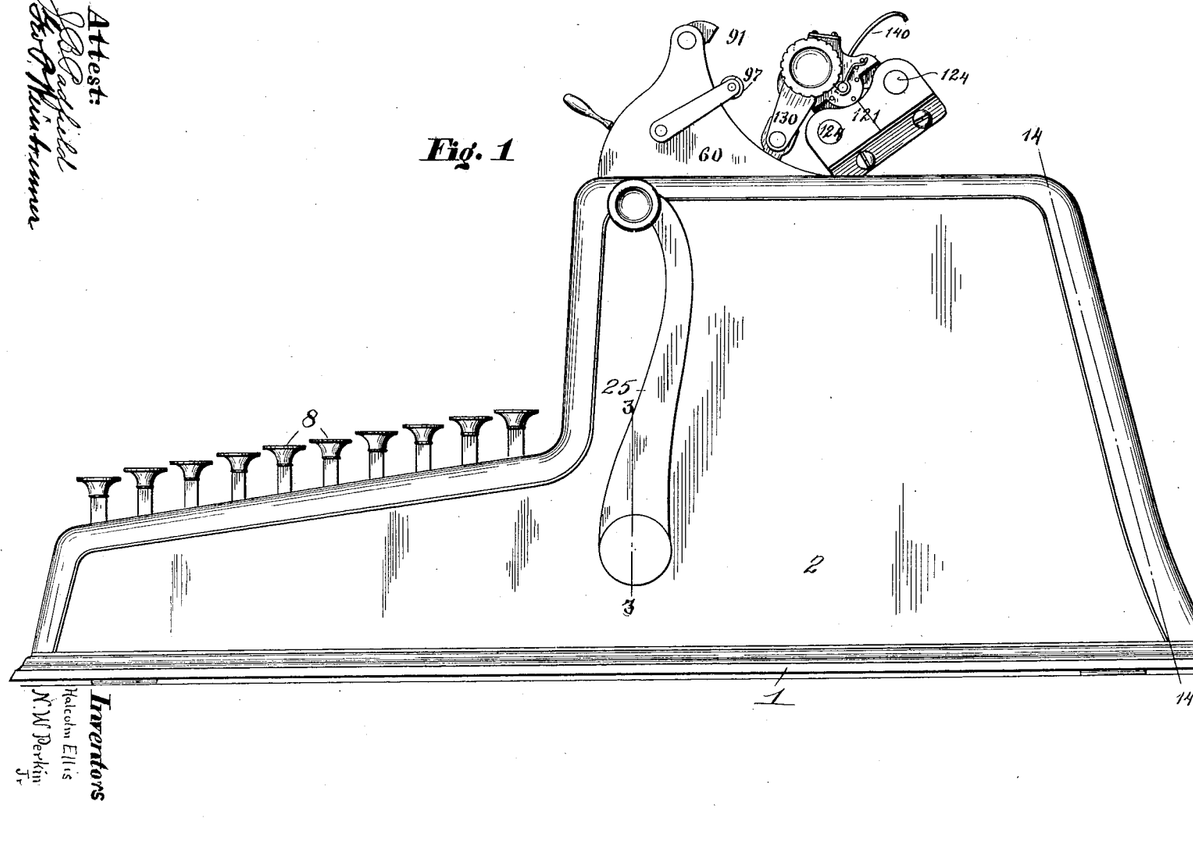
Figure 1 is a side view of the machine, showing the case covering the mechanism.
Figures 2, 3:
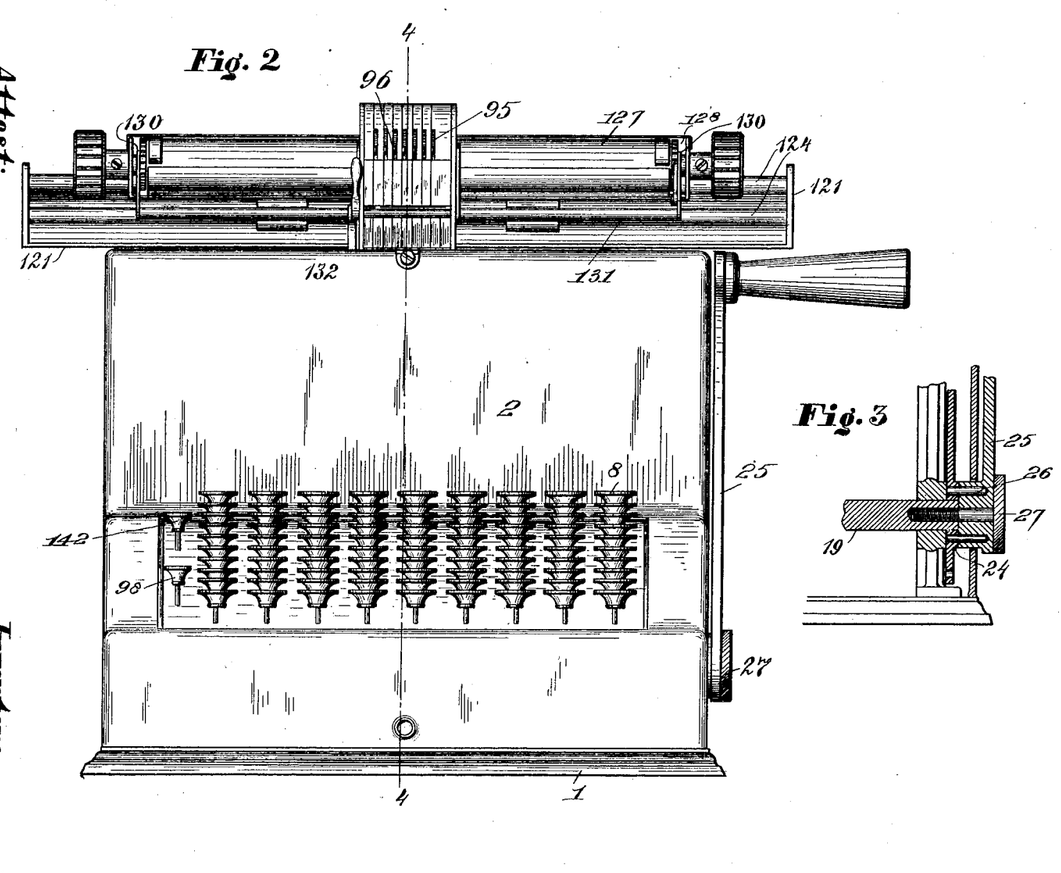
Fig. 2 is a front view of the machine, showing the lateral disposition of the keys.
Fig. 3 is a vertical section on line 3 3 of Fig. 1, showing method of attaching the handle.
Figures 5, 6:
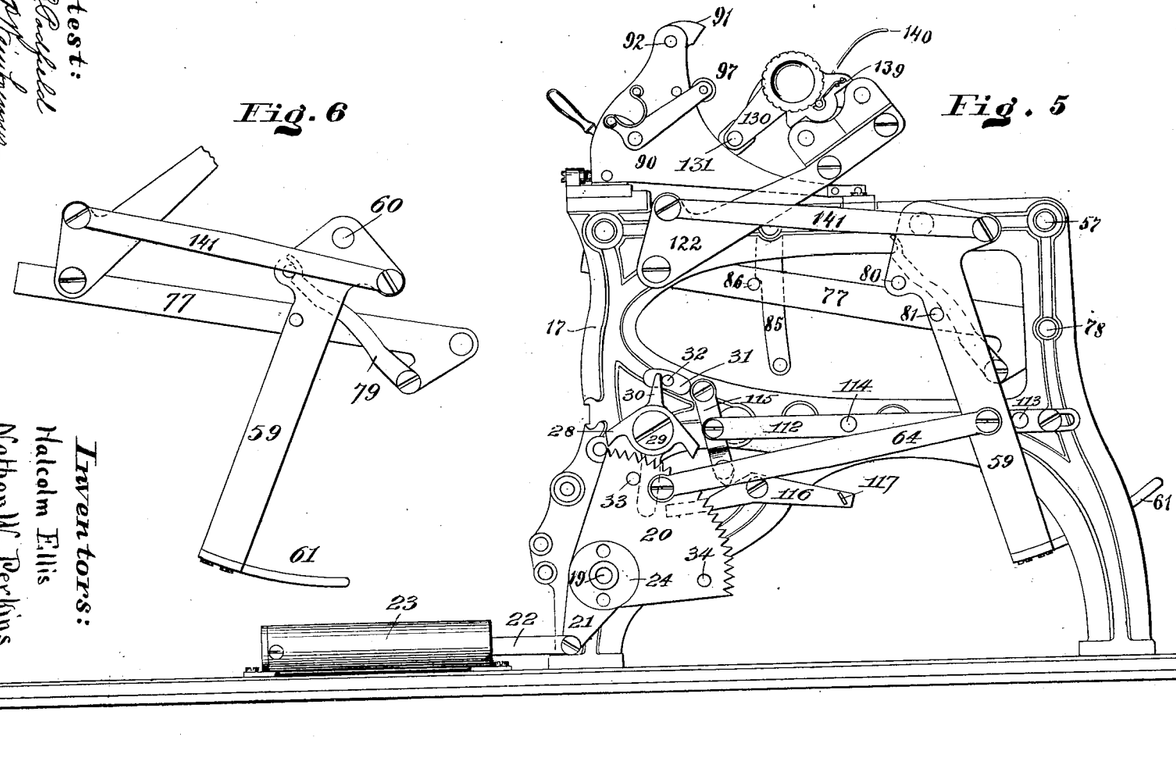
Fig. 5 is a side view of the right frame and working parts outside of it.
Fig. 6 is a detail of the carrier-operating device.

The entire mechanism of this machine is divided into two parts so far as the motive power for its action is concerned—namely, that operated by the action of the keys and those parts operated by the handle. The handle-operated parts are mostly at the rear of the machine and are supported by two upright frames 17 and 18, secured, respectively, at the right and left hand side of the base 1. These frames form the journals and housings for all the shafts and bars that extend from side to side of the machine. The main shaft 19 is journaled in the frames 17 and 18 and has fixed at its right end an irregular piece 20, provided with ratchet-teeth on an arc with the center of the shaft 19 as a center, and also a crank-arm 21, to which is connected the pitman 22 of a small air-check 23 of the usual construction. Piece 20 is provided with an external hub 24, to which the handle 25 is secured by two eccentric-pins 26 and a concentric screw 27, as clearly shown in Fig. 3. Above the teeth of the ratchet-piece 20 is a two-pointed pawl 28, pivoted on a heavy screw 29 to the frame 17. Secured to the back of the pawl 28 is a flat spring 30, the lower end of which presses against the side of the ratchet 20. The upper end presses against a small flat boss 31 on the frame 17, in the center of which is a small rounded projection 32. On the back side of the ratchet 20 are placed two pins 33 and 34. When the machine is at rest, the parts are as shown in Fig. 5. If the handle is moved forward, the pressure of the lower end of the spring 30 against the ratchet 20 keeps the front tooth of the pawl 28 out of engagement, the said pressure not being great enough to cause the upper end of spring 30 to pass over projection 32. When handle nears the end of its stroke, pin 34 strikes the side of spring 30 and carries the upper end thereof over projection 32. Now if handle 25 be reversed before the end of its stroke the friction of spring 30 against the side of the ratchet 20 will at once bring the front tooth of pawl 28 into engagement with the ratchet 20. The action is of course the same on the return stroke. It will be seen that this is a silent stop-pawl, which is never in engagement except when doing work, and the handle must complete its stroke in a given direction before it can be reversed.

Figure 4:
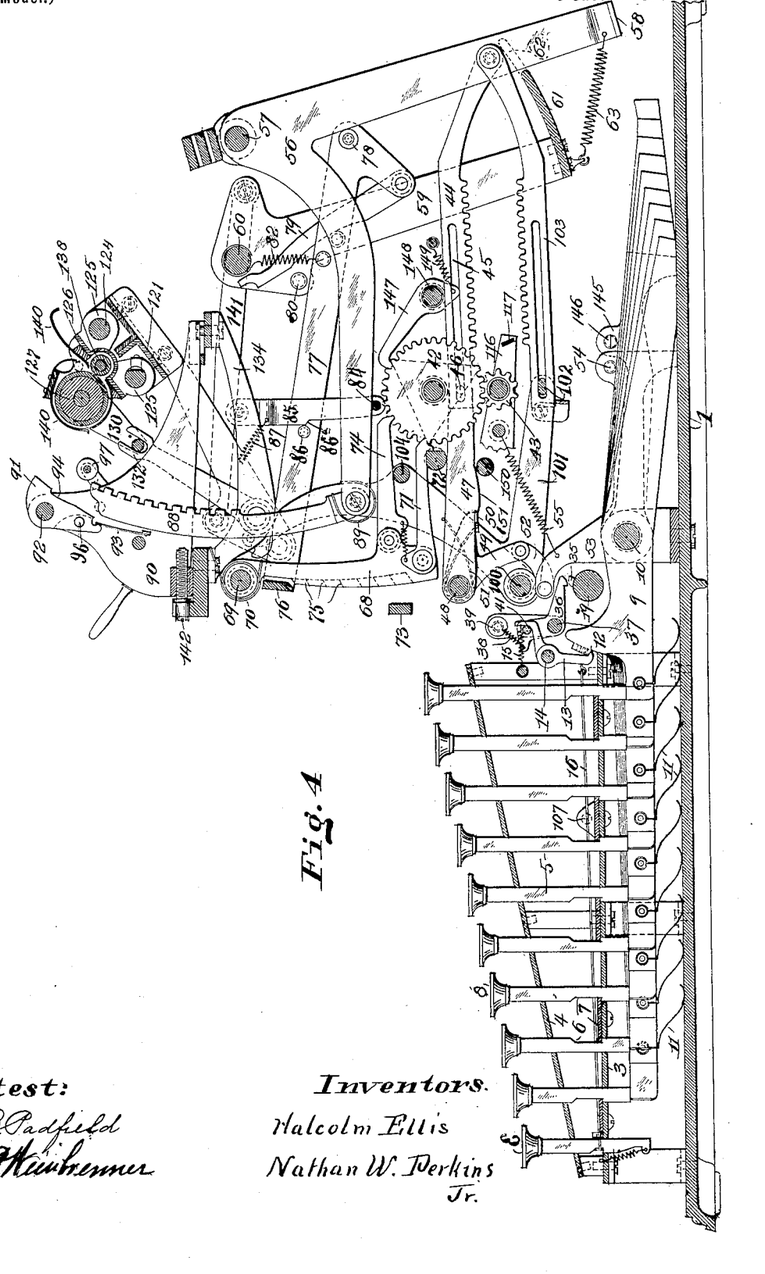
Fig. 4 is a vertical longitudinal section on line 4 4 of Fig. 2 with the case removed and parts broken away for sake of clearness.

The main shaft 19 has near each end, between the frames 17 and 18, a small lug 35, and as the action of each is identical, but one will be described. This lug 35 engages a hook 36 when the handle 25 is drawn forward, and the hook 36 is pivoted to a rod 37, which is hung in links 38, suspended from the side frames 17 and 18 by screws 39, and a spring 40 keeps the hook 36 in proper position to engage the lug 35. The upper end of the hook 36 carries a rod 41, which passes just in front of the upper end of the trigger 13. The operation of this device is as follows: The handle 25 is drawn forward, and lug 35 passes the lip on the hook 36. On the return stroke of the handle 25 the lug 35 carries hook 36 with it, swinging it on screws 39 as a center, rods 37 and 41 swing backward, and rod 41 releases all the triggers 13 that may be in engagement. On the return stroke of the handle 25 lug 35 revolves far enough to clear hook 36 and permits hook 36 to return to its normal position, as shown in Fig. 4. In this way the stop-bars 9 and the keys 8 are automatically restored to their normal position by the operation of the handle 25.

Figure 14:
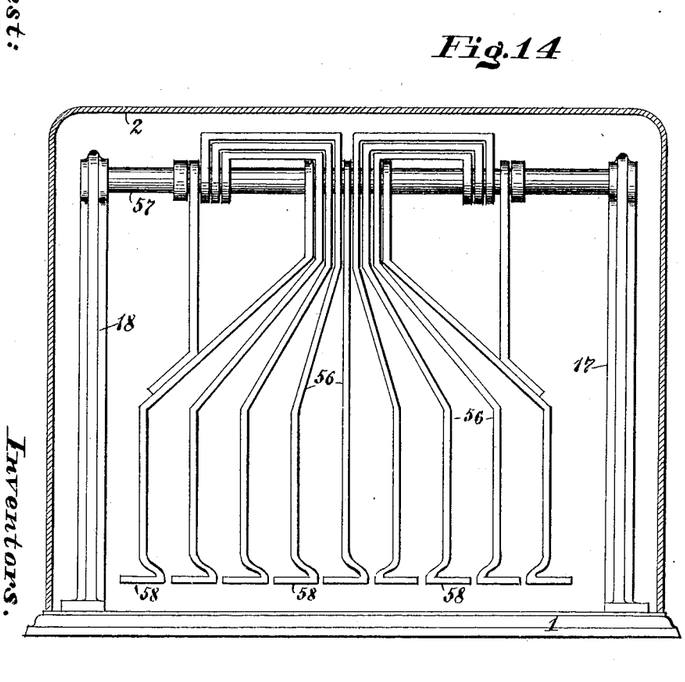
Fig. 14, a cross-section on line 14 14 of Fig. 1, showing how the sector-arms converge to the center.

*The adding mechanism.*—This consists of a series of nine accumulator-wheels 42, one for each column of keys, which are rotated in each case by a small pinion 43, placed directly underneath the accumulator-wheel 42. Pinion 43 is wider than wheel 42, so that a rack 44 can also engage it on its upper side. The rack 44 has a slot 45, through which a pin 46 extends, and the rack 44 is raised or lowered out of and into engagement with the pinion 43 by this pin 46. Pin 46 is secured in piece 47, which is pivoted on rod 48. The V-shaped piece 49 is also pivoted on rod 48 and has a small lip 50, which extends under the piece 47. A spring 51 tends to keep the two pieces 47 and 49 together. A link 52 connects piece 49 with piece 53, which is pivoted on the same rod 10 as the stop-bars 9 and has at its rear end a small cross-piece 54, extending over the top of the nine stop-bars 9. A spring 55 tends to keep the pin 46 in an elevated position and the rack 44 out of engagement with the pinion 43. (See Figs. 4 and 9.) The operation of this mechanism is as follows: A key 8 is depressed, which raises the rear end of a stop-bar 9, which in turn raises the cross-piece 54, and this causes piece 53 through link 52 and pieces 49 and 47 to lower the pin 46 and bring rack 44 into engagement with the pinion 43. When the stop-bar 9 is released, the reverse action takes place, and the rack 44 is disengaged from the pinion by means which will be described later. The rear end of the rack 44 is pivoted to the lower end of the sector-arm 56. These sector-arms 56 are irregular-shaped bell-cranks swung from the rod 57, their lower ends spread out laterally until they come in line with each column of keys 8 and terminate in a horizontal foot 58, which is as wide and directly over each set of nine stop-bars 9. The appearance of these as viewed from the rear is shown in Fig. 14. The upper ends of the sector-arms 56 lie close together in about the center of the machine. On the outside of the frames 17 and 18 there are two pieces 59, secured to the rod 60, which is journaled in the frames 17 and 18. The lower ends of 59 are secured to a cross-plate 61, which has notches 62 (see Fig. 4) cut in its rear edge to guide the lower ends of the sector-arms 56, and a separate spring 63 connects the plate 61 with each sector-arm 56. A connecting-rod 64 extends from the piece 59 on the right-hand side to the ratchet 20, (see Fig. 5,) and a similar connecting-rod 64$^a$ on the left-hand side connects to a crank 65 on the shaft 19. (See Fig. 7.) If the handle 25 is drawn forward and the shaft 19 rotated, the connecting-rods 64 and 64$^a$ will cause the plate 61 to swing, and the tension on the springs 63 will bring the sector-arms 56 forward until they meet some opposition, after which the springs 63 distend. This forward movement of the sector-arms 56 brings the rack 44 forward and rotates the pinion 43, which in turn rotates the accumulator-wheels 42. Whenever an accumulator-wheel 42 rotates through a distance of ten teeth, it must automatically rotate the next accumulator-wheel 42 to the left a distance of one tooth.

*The carrying device.*—Each accumulator-wheel 42 has secured to the left end of its hub 66 a triangle 67, whose points are separated by a distance of ten teeth on the wheel 42. A wing 68 is swung on a rod 69 and has a tendency to swing forward by means of the spring 70. The lower end of the wing 68 carries a hook 71, which catches over a bar 72, the point of said hook 71 being just within the path of the point of the triangle 67, and when triangle 67 revolves past the hook 71 it disengages said hook 71 from the bar 72 and permits the wing 68 to swing forward until it strikes the bar 73. A pawl 74, pivoted to the wing 68, engages the accumulator-wheel 42 to the left, and the swinging movement of the wing 68 is just sufficient to move the pawl 74 into engagement with the next tooth of the wheel 42. (See Figs. 4, 12, and 13.) The front edge of the wing 68 is provided with an incline 75. A bar 76 extends across the front of the wings 68 and is secured at each end to a piece 77, which is pivoted to the frames 17 and 18 at 78. To the lower end of the piece 77 is pivoted an irregular-shaped piece 79, which engages two pins 80 and 81 on the inner side of the piece 59. The operation of this movement is as follows: When 59 has been swung forward, the free end of 79 engages pin 80, as shown in Fig. 6. On the return stroke of 59 pin 80 pushes on piece 79. Near the end of its return stroke the lower pin 81 strikes the under side of piece 79 and disengages it from pin 80 and permits the spring 82 to raise the bar 76. When the hook 71 is disengaged from the bar 72, the inclined edge 75 of the wing 68 is in the path of the descending bar 76, and the wing 68 is swung back by the bar 76 until the hook 71 reëngages the bar 72. Their movement causes the pawl 74 to revolve the accumulator-wheel 42 a distance of one tooth. For consecutive carrying the inclines 75 are arranged in a diagonal line across the front of the machine, the highest being at the right, the lowest at the left, as indicated by the dotted lines in Fig. 4. To prevent the pawl 74 imparting sufficient momentum to the accumulator-wheel 42 to cause it to revolve more than one tooth, the upper corner of the pawl is beveled off, and a rod 84 extends across the machine, suspended by swinging links 85, suitably pivoted to the frames 17 and 18. A pin 86, secured in a lever 77, passes a set-off 86$^a$ on the link 85 and permits the rod 84 to swing forward, being impelled by a suitable spring 87. The rod is now directly over the beveled end of the pawl 74, and any further forward movement of said pawl 74 would cause the end to be wedged in tightly between the rod 84 and the accumulator-wheel 42.

Figures 16, 17, 18, 19, 20:
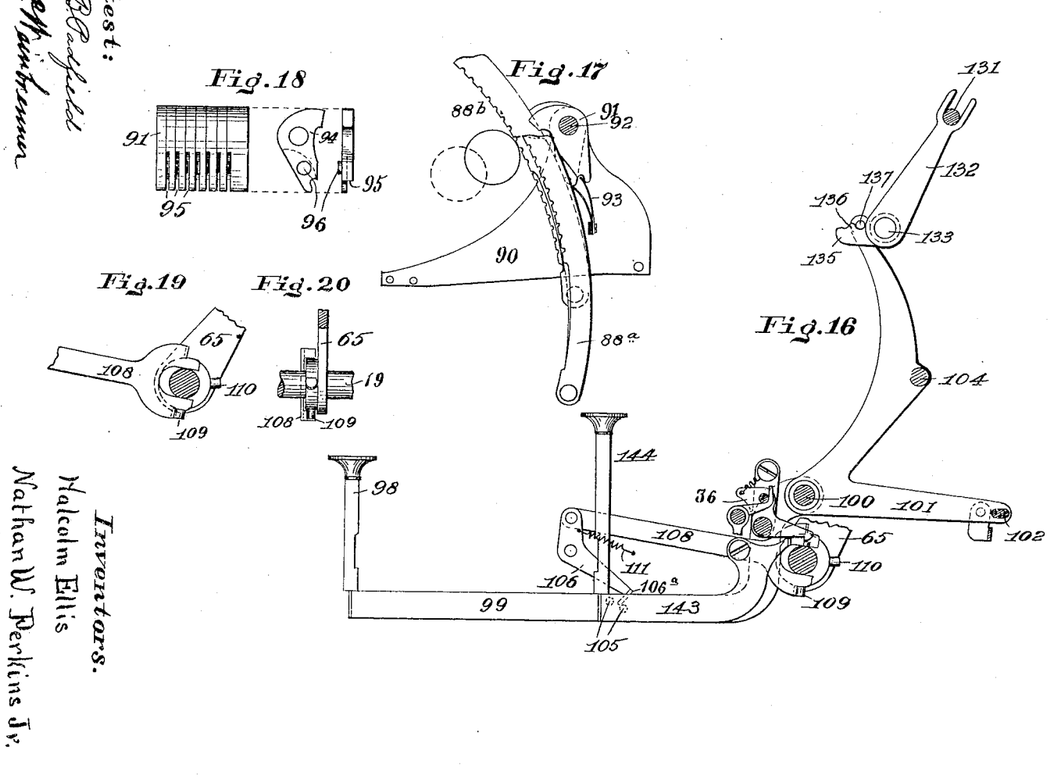
Fig. 16 is a detail showing the total-key and the multiplying-key and their attachments.
Fig. 17 is a detail showing the action of the turn-blocks on the sectors.
Fig. 18, a detail showing three views of the turn-blocks.
Fig. 19 is a side view of the lock-operating device for the total-key.
Fig. 20 is an end view of Fig. 19.

To the front of the piece 56 is pivoted the type-sector 88. The type-sector 88 is held normally in a forward position by means of the spring 89 and has eleven type engraved upon its face, beginning with "0" at the top. Then follows the numbers "1" to "9," with a "0" after the "9." The upper ends of the type-sectors 88 are confined and guided by two vertical plates 90, and as the type-sector 88 rise they come in contact with a series of turn-blocks 91, which are pivoted on a rod 92, extending between the plates 90. These blocks, of an irregular shape, are held in a normal position by springs 93, as shown in Fig. 4. The back face of turn-block 91 is curved on an arc of the same radius as the front side of the type-sectors 88, and about the middle of the back face of the turn-blocks 91 there is an indenture 94. When a type-sector 88 is raised till the upper "0" comes in the printing-line, the end of the type-sector is in the indenture 94; but when the type-sector 88 is raised until the type "1" "2," &c., is in the printing-line then the turn-block 91 will be tilted and the front edge of the type-sector will be in contact with the back face of the turn-block 91, and this will press the type-sector backward a short distance. This movement is shown in Fig. 17, in which the type-sector 88$^a$ is shown with the "0" brought to the printing-line. The type-sector 88$^b$ has been raised until the type "8" is on the printing-line, and it will be seen that the faces of the type on the sector 88$^a$ are farther back than those on the type-sector 88ᵇ. The turn-blocks 91 have a shoulder-recess 95 milled out of their left-hand sides at the lower end, and on the right-hand side there is secured a pin 96, which engages the edge of the recess 95 in turn-block 91 just to the right. From this it will be seen that whenever a turn-block 91 is tilted by the raising of a type-sector 88 it tilts all of the other turn-blocks 91 to the right, but leaves those to the left in their normal position. Therefore if in Fig. 17 a type-sector 88 to the right of (beyond) the type-sector 88ᵇ were raised so that when the first "0" came to the printing-line the corresponding turn-block 91 would force such sector backward until the face of the "0" type would be in line with the face of the type on the sector 88ᵇ. This is indicated by dotted lines. As the type-sectors 88 rise from their normal position, as shown in Fig. 4, to the printing-line they pass in light contact with the inking-roller 97, which is suitably supported by levers mounted on plates 90.

*Total mechanism.*—The total mechanism is brought into engagement by depressing the total-key 98, which in turn depresses the total-lever 99. (See Figs. 7 and 16.) The lever 99 is a bent one and mounted on the rod 100, which is journaled in the side frames 17 and 18. This rod 100 has secured to it at each end, just within the side frame 17 and 18, a V-shaped piece 101. The lower end of the piece 101 carries a bar 102, which extends through the series of racks 103, and the upper part of the V-piece 101 carries a rod 104, which extends across the machine just beneath the carry-pawls 74. Now when the total-key 98 is depressed it rotates rod 100 slightly, and this in turn causes the bar 102 to be raised and brings the rack 103 in line for engagement with the under side of the pinion 43. At the same time the rod 104 is raised and disengages all of the pawls 74, in this way leaving the accumulator-wheel 42 free to be revolved in a backward direction. It is desirable in this machine to keep the total-key depressed after the handle 25 has started on its forward movement until said handle shall have completed said movement, at which time the total-key 98 may be either released or held down while the handle returns to its normal position; but if held down when handle 25 starts on its return movement it should not be released before the handle 25 has completed its return movement. To accomplish this end, two pins 105 are secured to the outside of the lever 99 in a diagonal position, as shown in Fig. 16. A lever 106, having a flange 106ᵃ at its lower end, is pivoted to a bent end 107 of one of the strips 7. (See Fig. 4.) The upper end of lever 106 is pivoted to a yoke 108, the ends of which surround the main shaft 19 and are bent into the path of pins 109 and 110, secured to the hub of the crank 65, and a spring 111 tends to throw the yoke 108 in a backward direction. The operation of this device is as follows: When the handle 25 is in its normal position, the pin 109 is in contact with the lower end of the yoke 108 and has pressed it forward, as shown in Fig. 16. This swings the lever 106 so that the flange 106ᵃ at its lower end is out of the path of the two pins 105. As soon, however, as the handle 25 moves forward, pin 109 retreats, and the yoke 108 moves backward. This brings the flange 106ᵃ between the pins 105, and any attempt to depress the total-key 98 would press the upper pin 105 against the flange 106ᵃ, which would stop any further movement. If, however, the total-key 98 had been depressed before the handle 25 moved forward, then the flange 106ᵃ would swing above the upper pin 105 and prevent the total-key 98 from rising until the handle had completed its stroke, at which time the pin 110 on the hub of the crank 65 would come in contact with the upper end of the yoke 108 and press the yoke forward, which would withdraw flange 106ᵃ from the path of the pin 105. From this it will be seen that the movement of the handle 25 locks the lever 99 in either a raised or lowered position, and this whether the handle 25 starts a forward or a return movement. Figs. 19 and 20 show the method of connecting the yoke 108 to the shaft 19.

On the outside of the frames 17 and 18 is secured a sliding bar 112. This bar passes inside the swing-piece 59 and has a pin 113 arranged to be struck by the back edge of piece 59 when said piece nears its rearward position and a similar pin 114 arranged to be struck by the front edge of piece 59 when said piece 59 nears the limit of its forward movement. The forward end of the bar 112 is pivoted to a link 115, which link is pivoted to side frames 17 and 18. The lower end of the link 115 operates on the front end of a tilting lever 116, secured to the side frames 17 and 18. Between the rear ends of the tilting levers 116 there extends an incline-bar 117. The forward end of the tilting lever 116 is so shaped that when the piece 59 has, through the pin 113, drawn the bar 112 to its rearward position the link 115 strikes the forward end of tilting lever 116 and depresses said forward end, thus raising the bar 117. When, however, the piece 59 swings forward to its extreme limit, it strikes the pin 114, moves the bar 112 forward, which swings the lower end of the link 115 forward, and permits the tilting of lever 116 to drop the bar 117 into engagement with the teeth of the rack 103. This will prevent the rack 103 from moving any further in a forward direction.

Figures 7, 8:
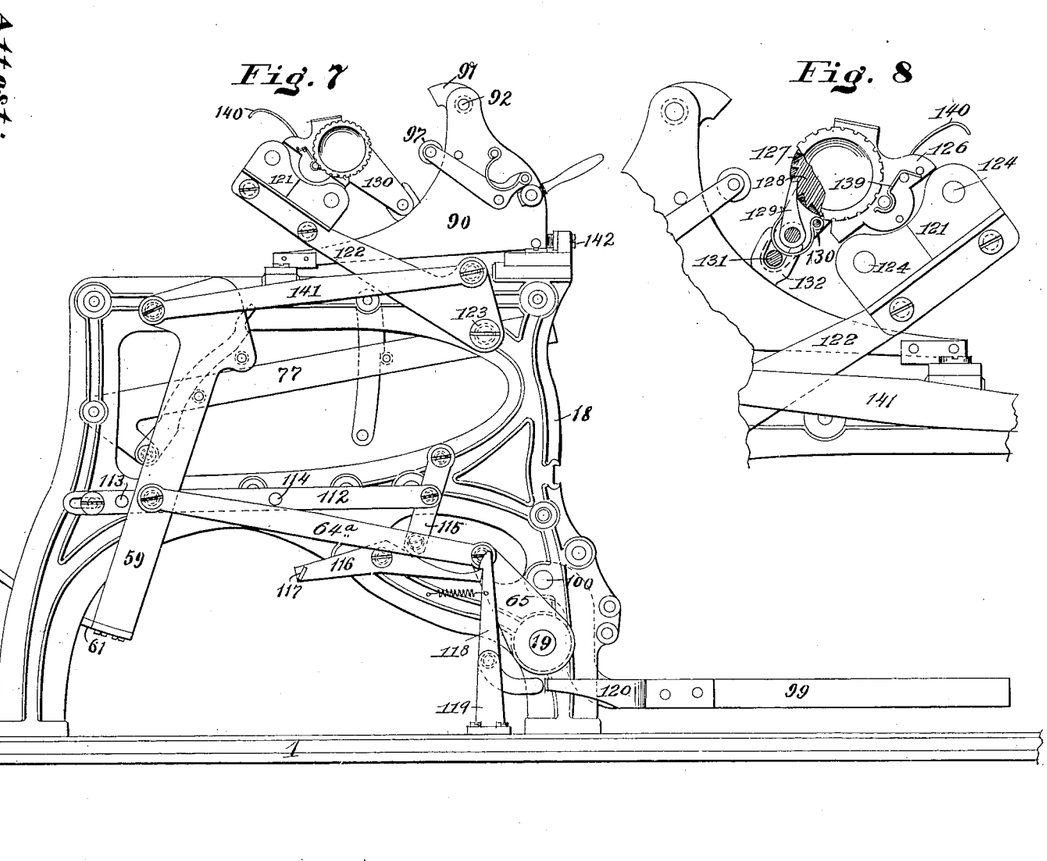
Fig. 7 is a side view of the left frame and working parts outside of it.
Fig. 8 is a detail of the carriage, parts broken away to show the rotating mechanism.

Referring to Fig. 7, a hook 118 will be seen engaging the forward end of the tilting lever 116. This hook is pivoted on the small base 119, mounted on the base 1, and the lower end of said hook 118 is bent forward. A bent arm 120, secured to the total-lever 99, contacts with the bent end of the hook 118, and when the total-key 98 is depressed said arm 120 disengages the hook 118 from the end of the tilting lever 116. When the hook 118 is in engagement with tilting lever 116, the movement of the link 115 does not affect the position of the bar 117, inasmuch as the hook 118 holds said bar 117 out of engagement with the rack 103.

*The paper-carriage.*—The printing in this machine is done by bringing the paper into a pressure-contact with the surface of the type on the type-sectors 88. The paper is fed by rotating the roller around which it passes and which forms the pressure-surface. This roller is capable of lateral adjustment, so that the figures can be printed in any desired position on the paper. The carriage consists, essentially, of a frame 121, mounted upon levers 122, which are pivoted at 123 to the side frames 17 and 18. The frame 121 is composed of two sections of angle-iron, as shown in Fig. 4, the ends of which are bent vertical to support two rods 124, along which slides the bearings 125 of the roller-holder 126. The roller 127 is of the usual construction and type used upon type-writing and adding machines and is provided with ratchet 128 at one end. The pawl 129 is mounted upon a swinging piece 130 at one end of the roller 127 and engages ratchet 128. A similar piece 130 at the other end of the roller is connected to the first piece 130 by means of a rod 131, which extends the full length of the roller 127. (See Fig. 2.) This rod 131 is held in its normal position by an arm 132, mounted upon a rod 133, (see Fig. 16,) which is journaled at one end in a frame 18 and at the other end in a piece 134, (see Fig. 4,) which is just to the left of the left-hand plate 90. The other end of the rod 133 carries a small lever 135, which has on its upper surface two indentures, with the rounded projection 136 on its upper side. The upper end of the left-hand V-piece 101 has an extension, which carries a pin 137, engaging the upper side of lever 135. The normal position of the arm 132 and the lever 135 is shown in Fig. 16, also in Fig. 4. If, however, the total-key 98 is depressed, the pin 137 will move forward right over the projection 136, depress the lever 135, and swing the fork-arm 132 forward. This in turn will swing the rod 131 forward and cause the pawl 129 to rotate the roller 127 through a distance of one space or one tooth on the ratchet 128, so that in taking a total the paper-carriage is rotated an extra place before the total is printed. A small contact-roller 138 is placed just below the roller 127 and held against roller 127 by the springs 139. Suitable paper-guides 140 conduct the paper around the roller 127. Connecting-rods 141 extend between the levers 122 and the swinging pieces 59 and are so arranged that when the handle 25 is drawn forward and piece 59 swings forward the connecting-rod 141 will swing the lever 122 forward and bring the roller 127 into contact with the type-sectors 88. This forward movement of the roller 127 does not affect the position of the fork-arm 132, which consequently holds the rod 131 stationary. The effect of this on the pawl 129 is to bring it into engagement with the next succeeding tooth of the ratchet 128. The return movement of the roller 127 brings the pawl 129 and rod 131 into the position shown in Fig. 8 and rotates the roller 127 through a distance of one space. The pressure between the roller 127 and the type-sectors 88 is regulated by means of the screw 142, which moves the plates 90 forward or backward and with them the turn-blocks 91.

Figure 15:
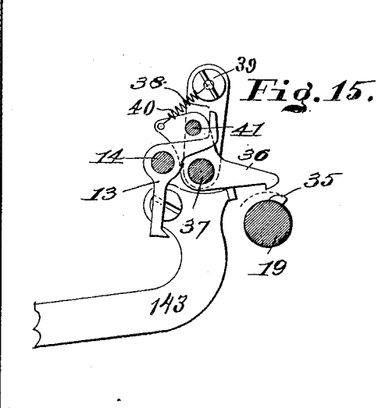
Fig. 15 is a detail showing the multiplying-key in operation.

*Multiplying-key.*—In machines of this character, where the operation of the keys 8 serves to establish stops which limit the movement of such parts of the machine as are operated by the handle 25 it is often desired to repeat a given amount set up on the keyboard a number of times. It therefore is incumbent that a method should be employed whereby the return stroke of the handle 25 will not automatically restore the keys 8. In this machine a lever 143 (see Fig. 15) is pivoted to the frame 18. The front end of this lever extends under trigger-hook 36 and the key 144 depresses the forward end of lever 143. This raises the rear end of 143 and with it trigger-hook 36, so that it will be out of the path of the travel of lug 35 on the main shaft 19, as shown in Fig. 17. Therefore the handle 25 on its return stroke will not cause lug 35 to release the triggers 13 through their connecting mechanism.

In machines of this character it is customary to omit the "0's" from the keyboard and so design the machine that the "0's" will be automatically taken care of in both printing the figures and taking the total. In printing the figures with this machine it becomes necessary that the "0" stop-bars, whose action shall be similar to the stop-bars 9, shall be provided and shall be automatically operated. These stop-bars are numbered 145 and can be seen in Figs. 4, 9, 10, and 11. They are pivoted to the same rod 10 as the stop-bars 9, and one "0" stop-bar 145 is provided for each set of nine stop-bars 9. To a small lug on the top stop-bars 145 there is secured a pin 146. This pin 146 has a small projecting shoulder extending through on the left-hand side of the bar 145 and a corresponding recess cut from its lower half at the extreme right-hand end, as clearly shown in Fig. 10. The pin 146 extends across the top of the entire set of stop-bars 9, so that when any key is depressed and a stop-bar 9 rises it carries with it the pin 146 and the automatic "0" stop-bar 145, and through the pin 146 all of the automatic stop-bars 145 in columns to the right of the one where the key was depressed are also raised. Thus if the figure "5" in the thousands-column be depressed the automatic stop-bars 145 would be set in the hundreds, tens, and units columns to the right.

In order to keep the pinion 43 in the exact position to engage the upper and lower racks 44 and 103, a centering-pawl 147 (see Fig. 4) is mounted on the rod 148 and kept in engagement with the accumulator-wheel 42 by means of a suitable spring 149. This centering-pawl 147 is made with a blunt nose, so that the accumulator-wheel 42 can rotate both forward and backward while pawl 147 is in engagement therewith.

Figures 12, 13:
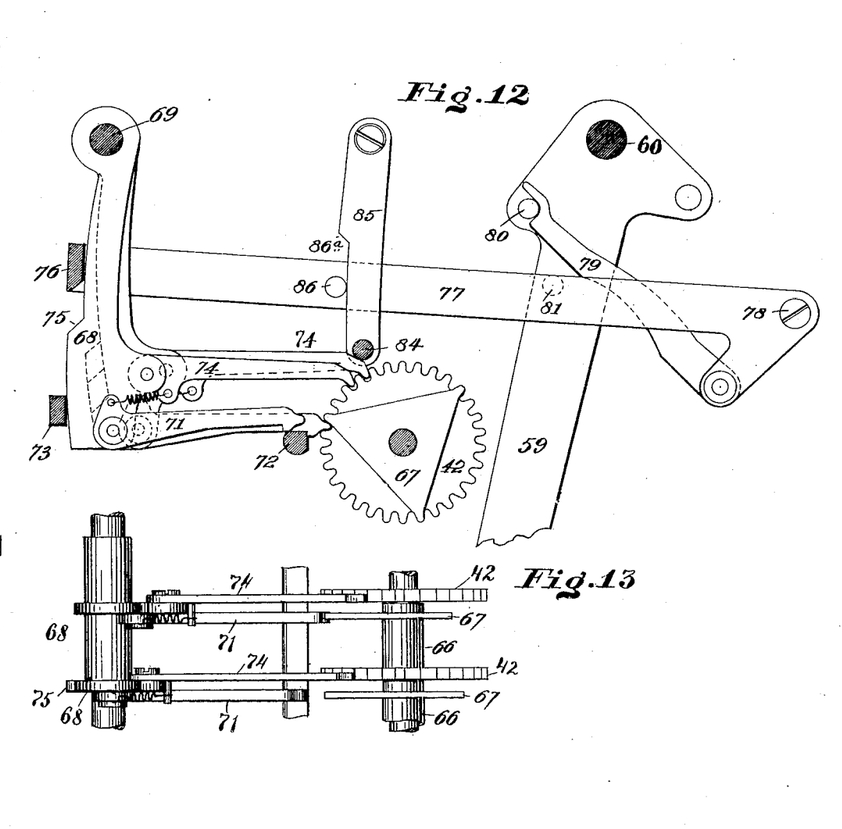
Fig. 12 is a detail side view of the carrying device shown in both positions.
Fig. 13 is a plan view of Fig. 12.

*The operation of the machine.*—When it is desired to add a particular number, the keys 8 in the corresponding places are depressed. For instance, in adding five hundred and fifty-five the "5" key in the hundreds-column, the "5" key in the tens-column, and the "5" key in the units-column are depressed. The operation of each key and its corresponding mechanism being the same throughout the machine, the action of but one column will be followed. When the key 8 is depressed, it pushes the corresponding stop-bar down and tilts its rear end up. The small lug 12 on stop-bar 9 engages the trigger 13, passes said trigger, and the trigger falls above it. This holds the stop-bar in its tilted position, the key 8 remaining down. The rear end of the stop-bar 9 is now raised and in the path of the foot 58 of the piece 56. If, however, an error was made and the wrong key 8 was depressed, then the error-key E should be depressed, which releases the trigger 13 from engagement with the lug 12, and the proper key 8 may then be depressed. When the rear end of stop-bar 9 rises, it strikes the cross-bar 54 and raises the same. This causes the piece 53 to swing forward and through 52 depresses the long end of piece 47 and with it the pin 46, bringing the rack 44 into line for engagement with the pinion 43. This movement is clearly shown in Fig. 9, in which the number "8" key 8 has been depressed. The handle 25 is next drawn forward. It rotates the shaft 19 and through the connecting-bars 64 swings the cross-plate 61 forward. The springs 63 swing piece 56 on the rod 57. It will be seen by examining Fig. 4 that there is a distance between the normal position of the foot 58 of the piece 56 and the end of the longest stop-bar 9, which is the stop-bar for the "1" key 8. There is also a space between the pinion 43 and the first tooth on the rack 44. When the handle 25 has caused the foot 58 to swing until it is in contact with the lowest stop-bar 9, if the same was elevated at its rear end the first tooth of the rack 44 would have caused the pinion 43 to revolve a distance of one tooth. The pawl 147 would have ridden over one tooth and would rest between the next successive ones. This movement of the piece 56 would cause the type-sector 88 to rise and bring the "1" type on the printing-line, passing the inking-roller 97 before being elevated to the printing-line. The object of this apparent lost motion between the foot 58 and the first stop-bar 9 and the lack of teeth on the rack 44 and also on the rack 103 is to permit a sufficient movement of the type-sectors 88 to cause them to pass the inking-roller 97 before coming to the printing-line. If the key 8 numbered "5" had been depressed, the foot 58 would strike the "5" stop-bar 9 and the rack 44 would rotate the pinion 43 a distance of five teeth. Whenever the foot 58 strikes the end of one of the stop-bars 9, the spring 63 distends as the guide-plate 61 is swung forward to the extreme limit of its forward position. As piece 59 swings forward connecting-rods 141 swing the levers 122 forward and upward and bring the roller 127 into contact with the type on the sectors 88. In this way the printing is accomplished. As piece 59 swings forward its front edge hits pin 114, pushes the sliding bar 112 into its forward position, and swings the links 115 forward. To the lower end of the links 115 is connected a rod 150, which is just below the arm 47 and forward of the position of rod 150. When in its retracted position, there is a cam 151 extending downward. When piece 59 has completed its forward movement, rod 150 has been swung forward under the cam 151 and in this way raised the arm 47 and the pin 46, so that the rack 144 is disengaged from the pinion 43, as shown by the dotted lines in Fig. 9. The handle 25 is now ready to start its return stroke, the pin 34 on the ratchet 20 having caused the pointed end of the spring 30 to ride over the projection 32 on the boss 31 and turn pawl 28 so that its rear point would be ready for engagement. The lug 35 on the main shaft 19 has passed the point of the trigger-hook 36 and is now in engagement therewith. As the handle recedes trigger-hook 36 swings backward and carries with it the rod 41, which disengages the trigger 13 and the printing-roller 127 swings back to its normal position. In doing so the pawl 129 acts on the ratchet-wheel 128 and rotates the printing-roller 127 through a distance of one space. The normal position of the accumulator-wheels 42 is that shown in Fig. 12, wherein the triangles 67 have their points so that one of them comes just above the point of the hook 71 when the same is in engagement with the bar 72. The act of adding causes the rack 44 to rotate pinion 43 to the left and the accumulator-wheel 42 to the right. When the accumulator-wheel 40 has rotated a distance of ten teeth, the next succeeding point of the triangle 67 will have come in contact with the point of 71 and disengage said hook 71 from the bar 72, as shown in Fig. 12. This permits the wing 68 to swing forward and brings the pawl 74 into the next succeeding tooth of the accumulator-wheel 42. Now when the piece 59 is swung forward and racks 44 have rotated the wheels 42 to the amount respectively set up on the keys 8 of the corresponding columns the piece 79 comes into engagement with the pin 80 and the return stroke of the handle 25 causes the pin 80 to act on piece 79 and depresses the bar 76, which strikes the incline edge 75 of the wing 68 and swings wing 68 backward until the hook 71 is in engagement with bar 72. This rotates the next accumulator-wheel 42 to the left a distance of one tooth by means of the pawl 74, which then comes into the position of the upper pawl 74 shown in Fig. 12. It will be seen from this that the carrying is done on the return stroke of the handle 25, the adding being done on the forward stroke of said handle.

Consecutive carrying is done in the following manner: If, for instance, the accumulator-wheels 42 have each been rotated through a distance of nine teeth and the "1" key in the units-column is then depressed and the handle 25 operated, the triangle 67, connected to the accumulator-wheel 42 of the units-column, will be in position shown in Fig. 12 and the wing 68, between the triangle 67 of the units-column and the accumulator-wheel 42 of the tens-column, will be in the position shown by the forward wing 68 in Fig. 12. When the handle 25 begins its return stroke, the bar 76 will strike the incline 75 of the first wing 68, which is the highest incline 75, (see Fig. 4,) and swing this wing 68 until hook 71 reëngages bar 72. This will at once rotate accumulator-wheel 42 for the tens-column a distance of one tooth, which will release the corresponding hook 71 and permit the second wing 68 to spring forward. As bar 76 descends it will strike this wing on the incline 75, bring hook 71 into engagement, turn the accumulator-wheel 42 a distance of one tooth in the column above, and release the succeeding hook 71. In this way the successive carrying goes on until bar 76 has reached the limit of its downward movement, at which all of the eight wings 68 may be sprung forward and then brought back until the detached hooks 71 are reëngaged with the bar 72.

In printing an ordinary sum like five hundred the "5" in the hundreds-column is depressed and this brings into engagement the automatic "0" stop-bars 145 in the columns to the right. These "0" stop-bars 145 are shorter than the shortest stop-bar 9 by an amount about equal to the difference in length between two of the stop-bars 9, so that when the foot 58 of the piece 56 strikes the automatic stop-bar 145 the "0" at the lower end of the row of type on the type-sector 88 will be in the printing-line. The object of having two "0's" on the type-sector 88 and making the automatic "0" stop-bar 145 the shortest of all the stop-bars is to prevent the unnecessary tension on the spring 63 when the handle 25 is drawn forward and "0's" are to be printed.

To take the total after any various amounts have been added, the total-key 98 is depressed, which raises the bar 102 and brings all of the racks 103 into line for engagement with the under side of the pinion 43. The upper end of the V-piece 101 will cause the yoke 132 to swing the rod 131 forward, and this will cause the pawl 129 to rotate the roller 127 through a distance of one space. If the handle 25 is now drawn forward, it will cause the racks 103 to move forward until they are all in engagement with the pinion 43. Now if in any particular column the figure of the total is represented by "0" the triangle 67 will have one point just above the point of the hook 71, and this will stop all further revolution of its connected accumulator-wheel 42 and pinion 43. The forward movement of the plate 61 will simply distend the spring 63. In this position, however, the upper "0" on the type-sector 88 will have passed the inking-roller 97 and be on the printing-line. It will not, however, tilt the turn-block 91, but will extend into the indenture 94, so that in taking a total all the "0's" are bound to be raised to the printing-line. Now if in any column the total is represented by a figure from "1" to "9" the rack 103 will rotate the pinion 43 and the accumulator-wheel 42 will reverse its movement a distance which will correspond in number of teeth to the figure in the total, at which time the point of the triangle 67 will engage the top of the point of the hook 71 and stop all further movement of the rack 103. This movement of the rack 103 will permit the corresponding type-sector 88 to bring the type numbered "1" to "9" into the printing-line, and this sector will tilt the turn-block 91 and bring this sector rearward. At the same time the turn-block 91 will tilt all of the turn-blocks 91 to the right or in columns below. For instance, if the sum-total was five hundred, the hundreds-column sector 88 would rise until the "5" type came on the printing-line. The sectors 88 for the tens-column and the units-column would not rise, but the turn-blocks would tilt and the upper "0" would be pressed backward until its face was level with the "5" in the hundreds-column. The "0's" to the left or above the hundreds-column sector 88 would not tilt. Therefore the "0's" on these sectors 88 would remain below the surface of the printing.

The machines ordinarily constructed in this country are for use in adding money, and such a machine is shown in the drawings. The two columns to the right are for the units and tens and cents, and if the total is represented by a number of cents less than ten it is customary to print the "0" before such figure. For instance, five cents is represented by ".05." Therefore the turn-block 91 for the first and second sectors 88 to the extreme right is made in one piece.

It is not necessary to confine this machine to the adding of decimals, as any other system of figures may be used by simply varying the distance or number of teeth in the accumulator-wheel 42 between the points of the triangle 67.

Having described our invention, we claim—

1. The combination in an adding-machine of a column of keys, a separate pivoted stop-bar connected to be operated by each key, a printing device and an adding device, and a moving part to which the printing and adding devices are connected, the travel of said moving part being limited by the stop-bars when in operation, substantially as described.

2. The combination in an adding-machine of a printing device, an adding device, and a moving part to which the printing and adding devices are each connected, pivoted stop-bars of graded length which in operation limit the travel of the said moving part, substantially as described.

3. The combination in an adding-machine of series of columns of keys, a separate pivoted stop-bar connected to each key, latches for holding said stop-bars in their operative position, means for releasing said latches independently, and means for releasing said latches simultaneously, substantially as described.

4. The combination in an adding-machine of a series of columns of keys, a separate pivoted stop-bar connected to each key, a rack for turning the adding mechanism, and a rack-engaging mechanism operated by the stop-bars, substantially as described.

5. The combination in an adding-machine of two racks connected to the same moving part, an adding device, means for alternately engaging the said racks so that they will rotate the adding device in opposite directions, and pivoted stop-bars of graded length which in operation limit the travel of said moving part, substantially as described.

6. The combination in an adding-machine of type-bearing sectors, pivoted to moving arms, means for raising the type-surface of all sectors that print above the type-surface of the sectors that do not print, and a platen which presses the paper against the raised type, substantially as described.

7. The combination in an adding-machine of a total-key, a paper roll about which the paper to be printed passes, and means for automatically rotating the said roll an extra space when the total-key is operated, substantially as described.

8. The combination in an adding-machine of a total-key and a paper-feeding device and means for automatically operating the paper-feed device an extra space whenever the total-key is operated, substantially as described.

9. The combination in an adding-machine of a handle, a rack, and a two-pointed pawl, means for holding said pawl out of engagement with said rack when the handle makes its full stroke in each direction, and means for bringing said pawl into engagement with said rack whenever said handle is reversed before completing its stroke in either direction.

10. The combination in an adding-machine of type-bearing sectors having fixed type thereon numbered "0," "1," "2," "3," and to "9" all the type being normally below the printing-line, an automatic device for raising the type-sector to the printing-line whenever a sector is moved to bring figure "1," or a higher number into printing position, on the sector so moved and all type-sectors to the right, and an inking device which operates to ink the type before the same are brought to the printing-line.

HALCOLM ELLIS.
NATHAN W. PERKINS, Jr.

Witnesses:
J. B. PADFIELD,
CHARLES C. ENGEL.